Jan. 24, 1961 J. VACKÁŘ 2,969,506

LOW FREQUENCY AMPLIFIER EXCITED BY WIDTH MODULATED IMPULSES

Filed May 22, 1958 2 Sheets-Sheet 1

INVENTOR.

Jiří Vackář

BY Richard Low Agt

Jan. 24, 1961 J. VACKÁŘ 2,969,506
LOW FREQUENCY AMPLIFIER EXCITED BY WIDTH MODULATED IMPULSES
Filed May 22, 1958 2 Sheets-Sheet 2
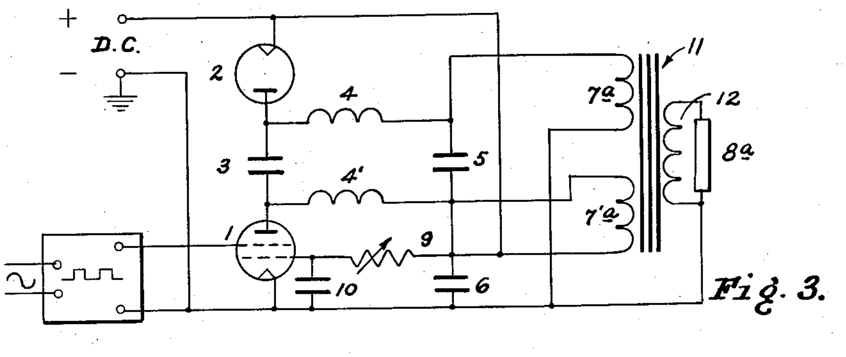
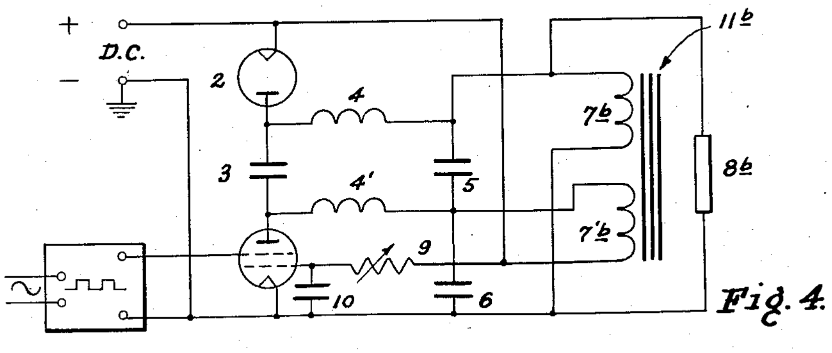
INVENTOR.
JIRI VACKÁŘ
BY
Richard Low
AGENT.

2,969,506
Patented Jan. 24, 1961

2,969,506

LOW FREQUENCY AMPLIFIER EXCITED BY WIDTH MODULATED IMPULSES

Jiří Vackář, Prague, Czechoslovakia, assignor to Tesla, narodni podnik, Prague, Czechoslovakia Filed May 22, 1958, Ser. No. 737,108

Claims priority, application Czechoslovakia May 25, 1957

15 Claims. (Cl. 330—207)

It is known that a considerable increase in the efficiency of a LF amplifier, particularly with a high power output, can be obtained if the output stage of the amplifier is excited by width modulated impulses of supersonic frequency (30–50 kc.), and if a special circuit is used in the anode branch of the tubes, with a reactive load at the supersonic frequency, and with recuperation of the reactive power by a diode.

All existing circuits based on this principle are connected in push-pull and require a relatively complicated device for balanced excitation at the required voltage levels.

An object of the invention is to provide a new type of LF amplifier which makes possible application of the above described principle by far simpler means. It employs an asymmetrical circuit and it operates in a somewhat different manner compared with existing circuits of this type.

The amplifier according to this invention comprises an amplifying tube and a diode, the anodes of the two tubes being coupled by a capacitor, the cathodes of the amplifying tube and diode are connected separately to the opposite pole of the source of D.C. voltage, and the anode circuits of the amplifying tube and of the diode include a separate impulse choke, and a LF choke which may be formed by one winding of an output transformer or autotransformer which is by-passed by a capacitor.

Figure 1:
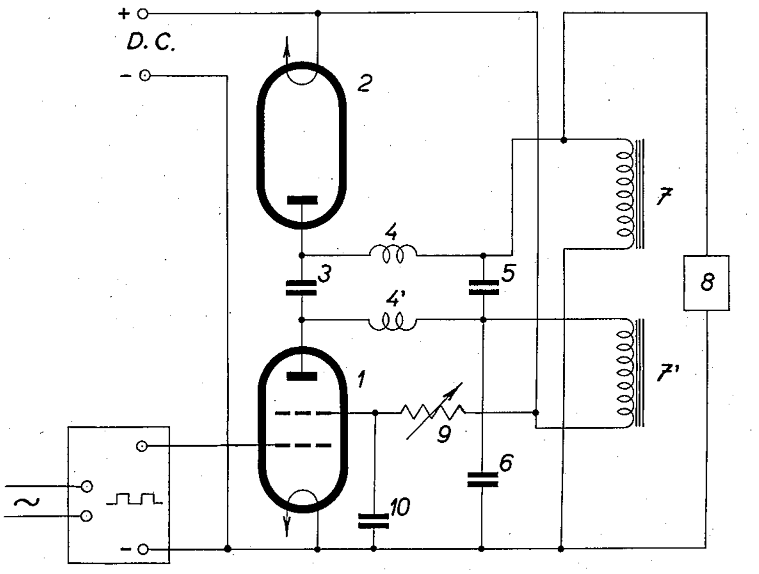
Figure 2:
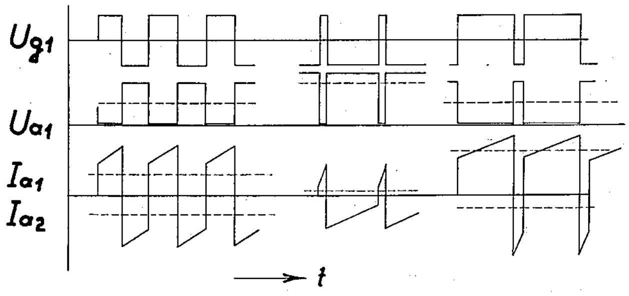

The invention will be best understood from the following detailed description of illustrative embodiments which is to be read in conjunction with the accompanying drawings, in which Fig. 1 is a wiring diagram of an amplifier according to the invention, Fig. 2 is a diagram showing the shape of the voltages and currents, Fig. 3 is a wiring diagram of an amplifier according to another embodiment of the invention, and Fig. 4 is a wiring diagram of an amplifier according to still another embodiment of the invention.

Referring to Fig. 1 in detail, it will be seen that, in an amplifier embodying the present invention, a capacitor 3 connects the anode of an amplifier tube 1 with the anode of a diode 2 and acts as a short-circuit for the impulse frequency and higher frequencies. Chokes 4, 4′ form a reactive load for the impulse frequency and their inductances determine the current shapes according to Fig. 2. With regard to the impulse oscillations they lie therefore in parallel, and hence do not require a mutual inductive coupling. In the illustrated example there are two of these chokes to effect direct current separation of the anode circuits. A capacitor 5 connects the ends of the chokes 4, 4′ remote from tubes 2 and 1 and has a valve which is considerably larger than the value of capacitor 3, and capacitor 5 acts as a short-circuit also for the low frequency oscillations of the amplified signal. Residual impulse frequency components are removed from the signal by a capacitor 6, and the signal is fed into the load resistor 8. The D.C. circuits of the anode current of the two tubes are closed through LF chokes 7, 7′, which may be replaced by two primary windings on a common output transformer, as represented in Fig. 3 by the windings *7a* and *7′a* of a transformer 11 having its secondary winding 12 connected to the load *8a*. In the latter case, where the two halves of the primary windings *7a* and *7′a* are inductively coupled on a common core, it is possible to omit capacitor 5 which connects the two windings in parallel for alternating current components. However, each of the primary windings then has to be provided with a separate capacitor 6.

Further, as shown in Fig. 4, the output load *8b* may be connected with one of the windings *7b* or *7′b* of the transformer *11b*, for example, with the primary winding *7b* as shown, so that the latter forms an autotransformer.

The operation of the circuit may be understood with the aid of Fig. 2, wherein:

$I_{a1}$ -----anode current of amplifying tube,
$I_{a2}$ -----anode current of diode,
$U_{a1}$-----anode voltage of amplifying tube, as a function of the exciting voltage $U_{g1}$ with different impulse ratios of the exciting impulses.

It is obvious that if the impulse ratio is 1:1 without a LF signal, the average values of the currents $I_{a1}$ and $I_{a2}$ are almost equal so that the pure supply current drawn from the source of D.C. voltage is very close to zero.

If during amplification of the LF signal the impulse duty cycle is varied at the rhythm of this signal, there appears in the sum of the average values of the currents of the two tubes a LF component corresponding to the original signal, the power of this component being fed into the load 8.

The high efficiency is obtained due to the fact that the amplifier tube operates in the active part of the impulse cycle with a very low residual voltage on the anode, and therefore also with a low anode dissipation. During the inactive part of the cycle, the amplifier tube is completely cut-off and its anode loss is zero.

It is obvious from the above that the described amplifier works like other types of impulse controlled amplifiers (so called recuperation amplifiers). During the active part of the impulse cycle of the amplifier embodying this invention, the energy, which in normal class B amplifiers is transformed into heat in the anode loss of the amplifier tube, is stored in the magnetic field of the inductances 4, 4′, and in the following part of the cycle this energy is restored (recuperated) by diode 2. Due to the fact that the current circuit of diode 2 is completed through the supply source and the load impedance, part of the restored or recuperated energy is returned to the source, and another part of this energy assists in increasing the output power.

What I claim is:

1. A low frequency amplifier stage excited by width modulated impulses, comprising a D.C. voltage source having positive and negative terminals; an amplifier tube having an anode, control grid and cathode; input terminals connected with said control grid and cathode, respectively; a diode having an anode and a cathode; the cathodes of said amplifier tube and diode being respectively connected to said terminals of the D.C. voltage source; a capacitor with two terminals; two impulse chokes each having two terminals; two LF chokes each having two terminals; an output load having two terminals; means connecting one of said terminals of the capacitor with said anode of the diode and with one of said terminals of one of said impulse chokes; means connecting the other of said terminals of the capacitor with said anode of the amplifier tube and with one of said terminals of the other of said impulse chokes; means connecting the other of said terminals of said one impulse choke with one of said terminals of one of said LF chokes and with one of said terminals of the output load; means connecting the other of said terminals of said other impulse choke with one of said terminals of the other of said LF chokes; means connecting the other terminals of said LF chokes respectively with said terminals of the D.C. voltage source; and means connecting the other of said terminals of the output load with one of said terminals of the D.C. voltage source and with the other of said terminals of said one LF choke.

2. A low frequency amplifier stage as in claim 1; wherein said positive terminal of the D.C. voltage source is connected with said cathode of the diode, and said negative terminal of the D.C. voltage source is connected with said cathode of the amplifier tube and with said other terminal of the output load.

3. A low frequency amplifier stage as in claim 1; further comprising an output transformer having a core, with said LF chokes being mounted on said core and forming two primary windings of said output transformer.

4. A low frequency amplifier stage as in claim 3; wherein said positive terminal of the D.C. voltage source is connected with said cathode of the diode, and said negative terminal of the D.C. voltage source is connected with said cathode of the amplifier tube and with said other terminal of the output load.

5. A low frequency amplifier stage as in claim 4; further comprising means connecting said output load with one of said primary windings so that the latter forms an autotransformer.

6. A low frequency amplifier stage as in claim 1; further comprising an output transformer having a core, with said LF chokes being mounted on said core and forming two primary windings of said output transformer, and means connecting said output load with one of said primary windings so that the latter forms an autotransformer.

7. A low frequency amplifier, comprising a driving voltage source including an impulse generator with pulse width modulation and two output terminals; a D.C. voltage source having positive and negative terminals; an amplifier tube having an anode, control grid and cathode; means connecting said output terminals of the impulse generator to said control grid and cathode, respectively, of the amplifier tube; a diode having an anode and a cathode; the cathodes of said amplifier tube and diode being respectively connected to said terminals of the D.C. voltage source; a capacitor with two terminals; two impulse chokes each having two terminals; two LF chokes each having two terminals; an output load having two terminals; means connecting one of said terminals of the capacitor with said anode of the diode and with one of said terminals of one of said impulse chokes; means connecting the other of said terminals of the capacitor with said anode of the amplifier tube and with one of said terminals of the other of said impulse chokes; means connecting the other of said terminals of said one impulse choke with one of said terminals of one of said LF chokes and with one of said terminals of the output load; means connecting the other of said terminals of said other impulse choke with one of said terminals of the other of said LF chokes; means connecting the other terminals of said LF chokes respectively with said terminals of the D.C. voltage source; and means connecting the other of said terminals of the output load with one of said terminals of the D.C. voltage source and with the other of said terminals of said one LF choke.

8. A low frequency amplifier as in claim 7; wherein said positive terminal of the D.C. voltage source is connected with said cathode of the diode, and said negative terminal of the D.C. voltage source is connected with said cathode of the amplifier tube and with said other terminal of the output load.

9. A low frequency amplifier as in claim 7; further comprising an output transformer having a core, with said LF chokes being mounted on said core and forming two primary windings of said output transformer.

10. A low frequency amplifier as in claim 9; wherein said positive terminal of the D.C. voltage source is connected with said cathode of the diode, and said negative terminal of the D.C. voltage source is connected with said cathode of the amplifier tube and with said other terminal of the output load.

11. A low frequency amplifier as in claim 10; further comprising means connecting said output load with one of said primary windings so that the latter forms an autotransformer.

12. A low frequency amplifier as in claim 7; further comprising an output transformer having a core, with said LF chokes being mounted on said core and forming two primary windings of said output transformer, and means connecting said output load with one of said primary windings so that the latter forms an autotransformer.

13. A low frequency amplifier stage excited by width modulated impulses, comprising a D.C. voltage source having positive and negative terminals; an amplifier tube having an anode, control grid and cathode; input terminals connected with said control grid and cathode, respectively; a diode having an anode and a cathode; the cathodes of said amplifier tube and diode being respectively connected to said terminals of the D.C. voltage source; a capacitor connected between the anodes of said amplifier tube and diode, respectively; a first impulse choke and a first LF choke connected in series between one of said anodes and one of said terminals of the D.C. voltage source; a second impulse choke and a second LF choke connected in series between the other of said anodes and the other of said terminals of said D.C. voltage source; and an output load connected across one of said first and second LF chokes and to a terminal of said D.C. voltage source.

14. A low frequency amplifier stage as in claim 13; wherein said first and second LF chokes are constituted by primary windings of a transformer having a common core so that the primary winding constituting said one LF choke across which said load is connected forms an auto-transformer.

15. A low frequency amplifier stage excited by width modulated impulses, comprising a D.C. voltage source having positive and negative terminals; an amplifier tube having an anode, control grid and cathode; input terminals connected with said control grid and cathode, respectively; a diode having an anode and a cathode; the cathodes of said amplifier tube and diode being respectively connected to said terminals of the D.C. voltage source; a capacitor connected between the anodes of said amplifier tube and diode, respectively; an output transformer having two primary windings on a common core and a secondary winding; a first impulse choke connected in series with one of said primary windings defining a first LF choke between one of said anodes and one of said terminals of the D.C. voltage source; a second impulse choke connected in series with the other of said primary windings defining a second LF choke between the other of said anodes and the other of said terminals of the D.C. voltage source; and an output load connected to a terminal of said D.C. voltage source and to said secondary winding of the transformer so as to be inductively coupled by the latter.

References Cited in the file of this patent

UNITED STATES PATENTS 2,500,756 Kerns ---------------- Mar. 14, 1950